(12) United States Patent
Huang (10) Patent No.: US 7,770,347 B2
(45) Date of Patent: Aug. 10, 2010

(54) BUILDING FRAME

(76) Inventor: Rong-Jun Huang, No. 18, Lane 480, Sec. 1, Situn Rd., Taichung (TW)

( * ) Notice: Subject to any disclaimer, the term of this patent is extended or adjusted under 35 U.S.C. 154(b) by 327 days.

(21) Appl. No.: 12/150,127

(22) Filed: Apr. 25, 2008

(65) Prior Publication Data

US 2009/0084060 A1  Apr. 2, 2009

(30) Foreign Application Priority Data

Sep. 27, 2007  (TW) ............................... 96216139 U (51) Int. Cl.
*E06B 7/08* (2006.01)
(52) U.S. Cl. ...................... 52/473; 52/589.1; 52/590.2; 52/590.3; 403/331; 403/381
(58) Field of Classification Search ................ 52/585.1, 52/589.1, 590.1, 590.2, 590.3, 591.1, 591.2, 52/592.2, 592.6, 233, 473; 403/331, 381
See application file for complete search history.

(56) References Cited

U.S. PATENT DOCUMENTS 1,898,297 A * 2/1933 Fox ............................ 446/122
2,397,458 A * 4/1946 Allen .......................... 52/473
4,688,362 A * 8/1987 Pedersen et al. ........... 52/223.7
4,962,914 A * 10/1990 Taylor ......................... 256/72
7,690,629 B1 * 4/2010 Briggs et al. .............. 256/65.12

* cited by examiner

*Primary Examiner*—Richard E Chilcot, Jr.
*Assistant Examiner*—Chi Q Nguyen (57) ABSTRACT

A building frame has multiple bars and two brace assemblies. Each bar is a straight rectangular bar and has a top surface and bottom surface and two mounting surfaces. The mounting surfaces may be indented surface respectively formed in the top and bottom surfaces of the bar. The brace assemblies are parallel with each other and each brace assembly has a primary brace and a secondary brace leant against the primary brace. The primary and secondary braces both have multiple mounting recesses being separately formed therein. Each mounting recess on the primary brace aligns with one mounting recess of the secondary brace. The mounting recesses of the primary brace and secondary brace correspond to and are engaged respectively the mounting surface of the top and bottom surfaces of one bar when the primary and secondary are alternatively moved.

5 Claims, 9 Drawing Sheets

BUILDING FRAME

BACKGROUND OF THE INVENTION

1. Field of Invention

The present invention relates to a building frame, and more particularly to an easy assembling building frame.

2. Description of the Related Art

Figure 9:
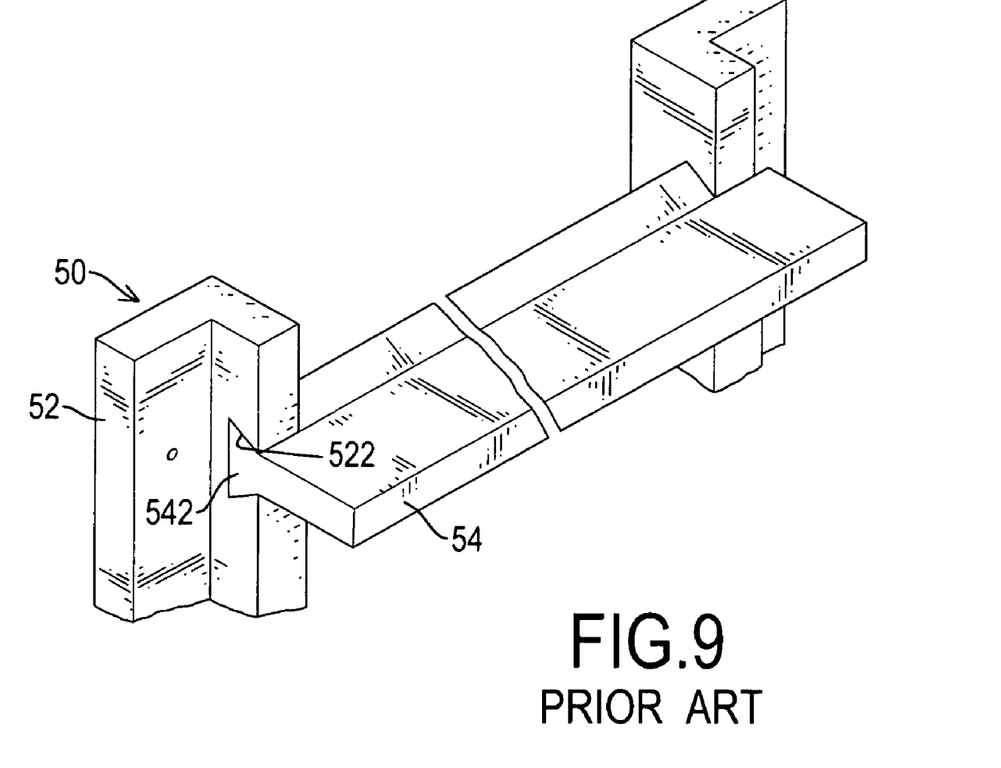
FIG. 9 is a partial perspective view of a conventional frame structure in accordance with prior art.

Kinds of frame structures are wildly used in building architectures. For instance, railings, fences, window fences, palings or the like are different frame structures commonly used for different purposes in buildings. Assembling parts of conventional frame structures securely are always not easy. For instance, FIG. 9 shows a conventional window fence (50) for reducing indoor solarization for a building. The window fence (50) is always mounted securely outside a window of the building and has multiple vertical braces (52) and multiple lateral bars (54). The vertical braces (52) are mounted on an outer surface of the building adjacent to the window and are parallel to each other. Each vertical brace (52) has multiple mounting recesses (522). Each one of the mounting recesses (522) corresponds to one of the mounting recesses (522) on another vertical brace (52).

Each lateral bar (54) is straight and has a connecting side (542) and two ends. The connecting side (542) corresponds to and engage corresponding mounting recesses (522) in corresponding vertical braces (52).

When assembling, two vertical braces (52) are parallelly mounted on the outer surface beside the window of the building, the connecting side (542) of one lateral bar (54) is then mounted in corresponding mounting recesses (522) in the two vertical braces (52) by inserting one end of the lateral bar (54) through the mounting recesses (522) of the vertical-braces (52) in sequence.

When multiple vertical braces (52) are used for a larger window, to mount each lateral bar (54) through the mounting recesses (522) of the vertical braces (52) one by one is troublesome and time-consuming.

The present invention provides an easy assembling building frame to obviate or mitigate the shortcomings of the conventional frame structure.

SUMMARY OF THE INVENTION

The primary objective of the present invention is to provide a building frame to improve ease of assembling the building frame.

The building frame has multiple bars and two brace assemblies. Each bar is a straight rectangular bar and has a top surface and bottom surface and two mounting surfaces. The mounting surfaces may be indented surface respectively formed in the top and bottom surfaces of the bar. The brace assemblies are parallel with each other and each brace assembly has a primary brace and a secondary brace leant against the primary brace. The primary and secondary braces both have multiple mounting recesses being separately formed therein. Each mounting recess on the primary brace aligns with one mounting recess of the secondary brace. The mounting recesses of the primary brace and secondary brace correspond to and are engaged respectively the mounting surface of the top and bottom surfaces of one bar when the primary and secondary are alternatively moved.

Other objectives, advantages and novel features of the invention will become more apparent from the following detailed description when taken in conjunction with the accompanying drawings.

DETAILED DESCRIPTION OF THE INVENTION

Figure 1:
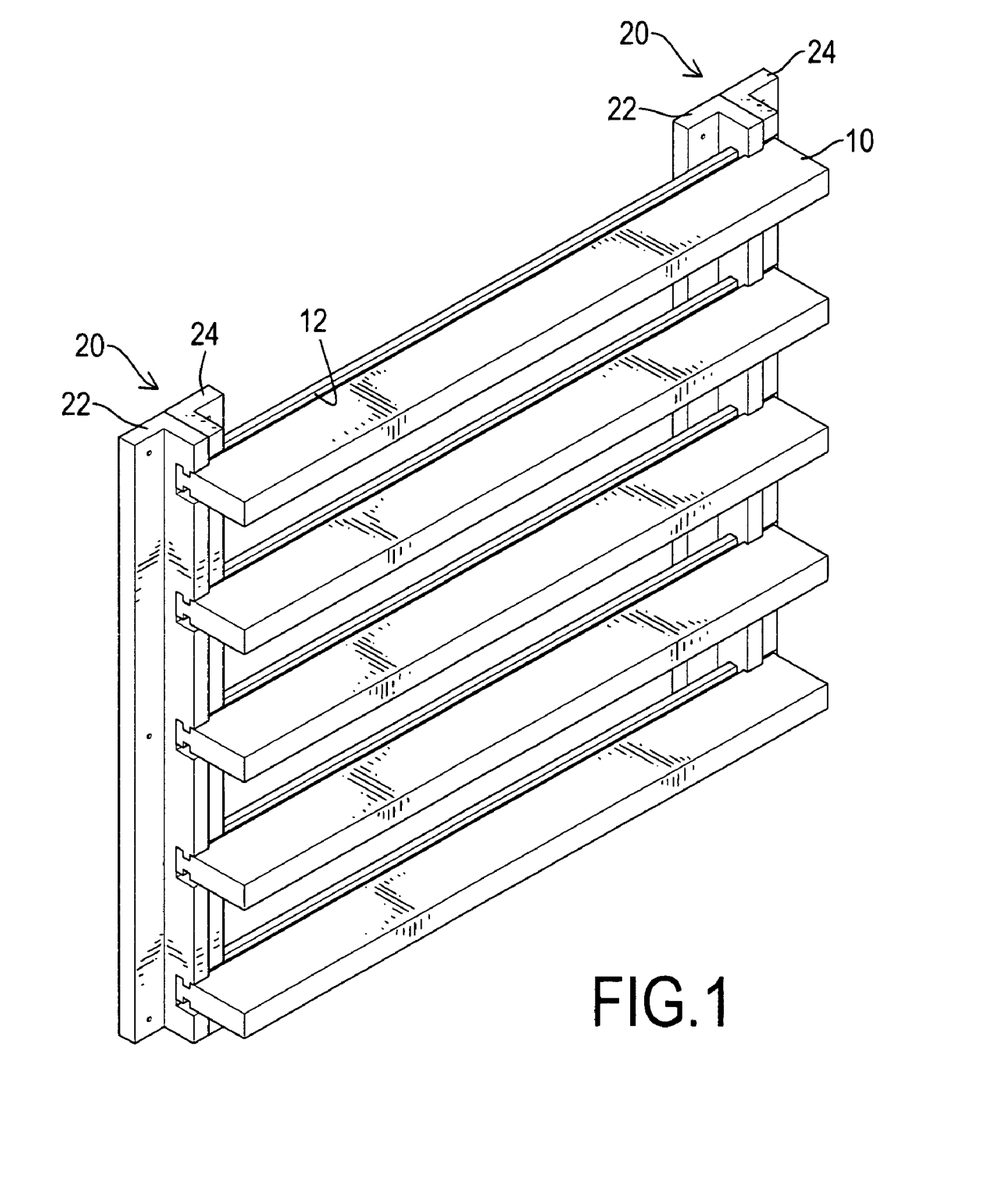
FIG. 1 is a perspective view of a building frame in accordance with the present invention.
Figure 2:
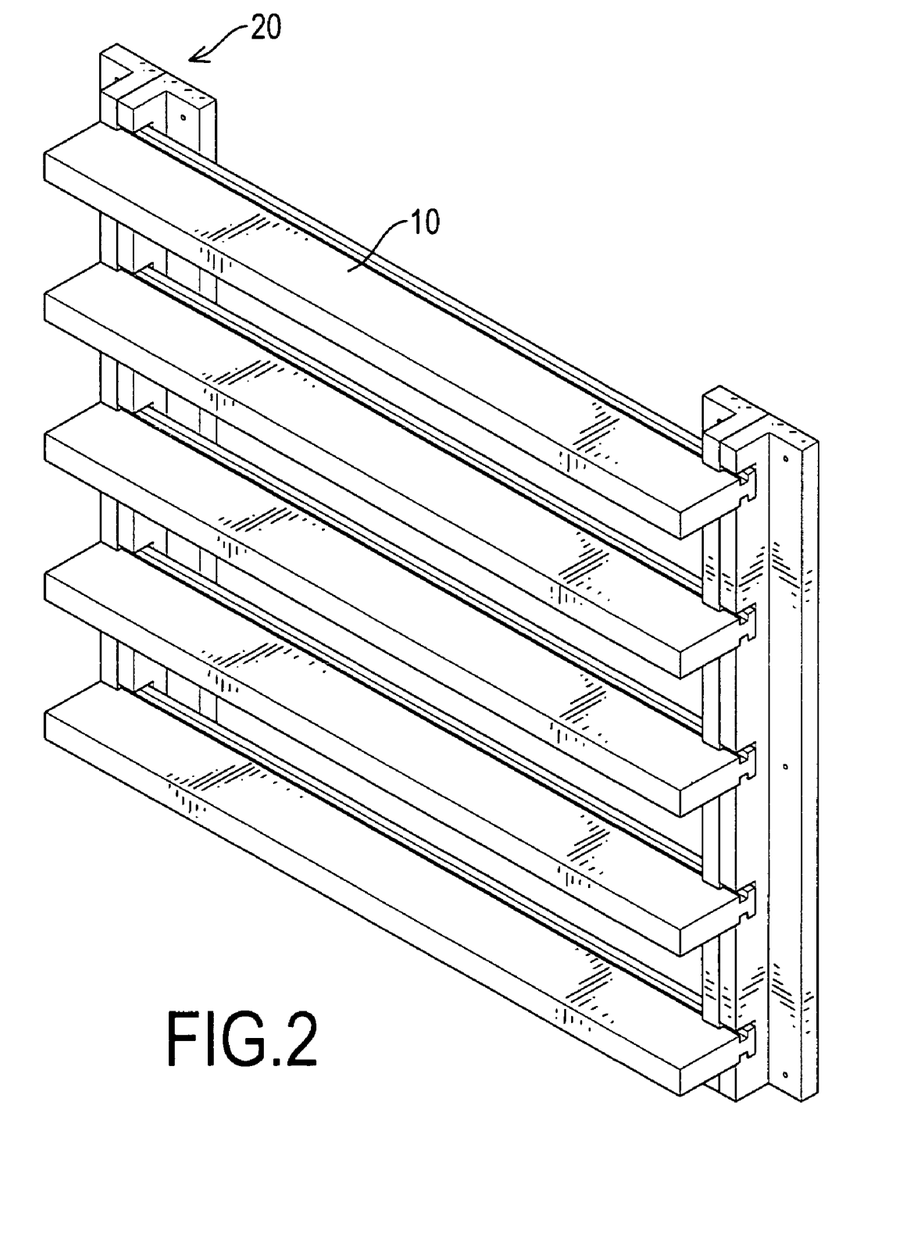
FIG. 2 is another perspective view of the building frame in FIG. 1, shown different viewing angle.
Figure 3:
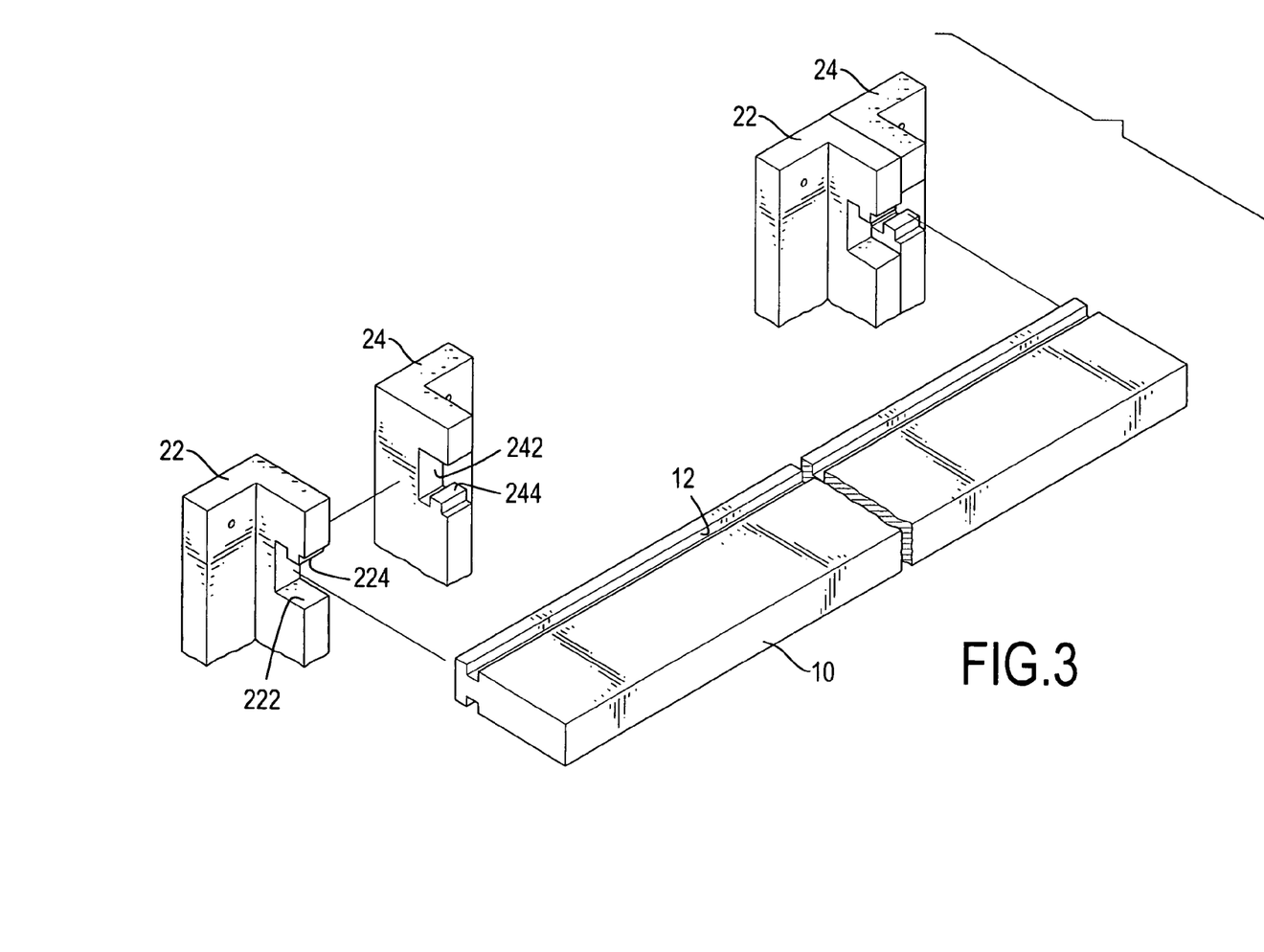
FIG. 3 is an enlarged, exploded perspective view of the building frame in FIG. 1.

With reference to FIGS. 1, 2 and 3, a building frame in accordance with the present invention comprises multiple bars (10), and at least two brace assemblies (20).

Each bar (10) is straight, may have a rectangular cross section and has a top surface, a bottom surface, a longitudinal edge and two mounting surfaces (12). Each mounting surface (12) may be an indented surface formed in the top surface or the bottom surface of the bar (10) adjacent to and parallel with the longitudinal edge. Each mounting surface (12) may also be a protruding surface formed on the top or the bottom surface of the bar (10). In a preferred embodiment of the present invention, two mounting surfaces (12) are the indented surface formed respectively in the top and bottom surface of the bar (10).

Figure 4:
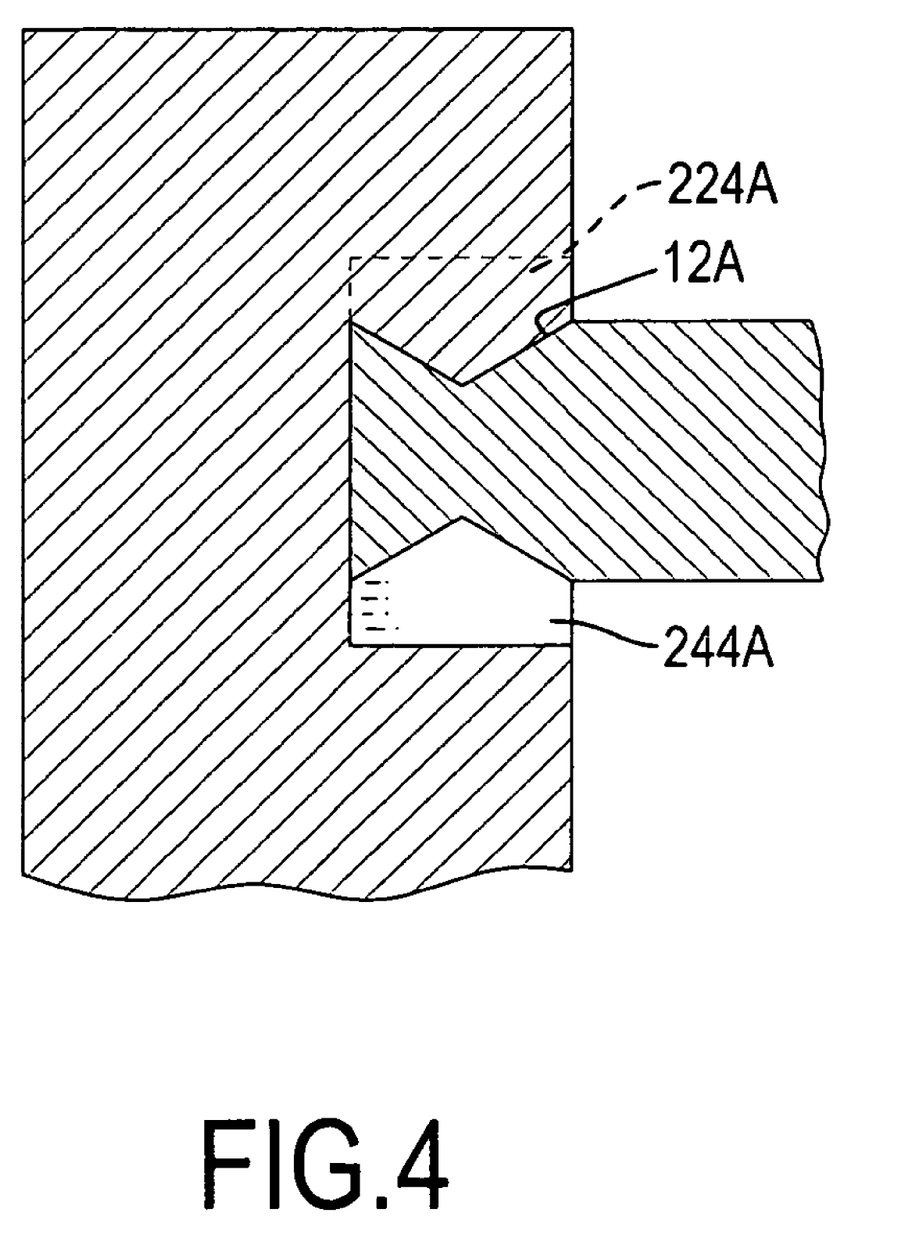
FIG. 4 is an operational cross sectional side view of a second embodiment of a building frame in accordance with the present invention, showing that a bar is clamped on a brace assembly.
Figure 5:
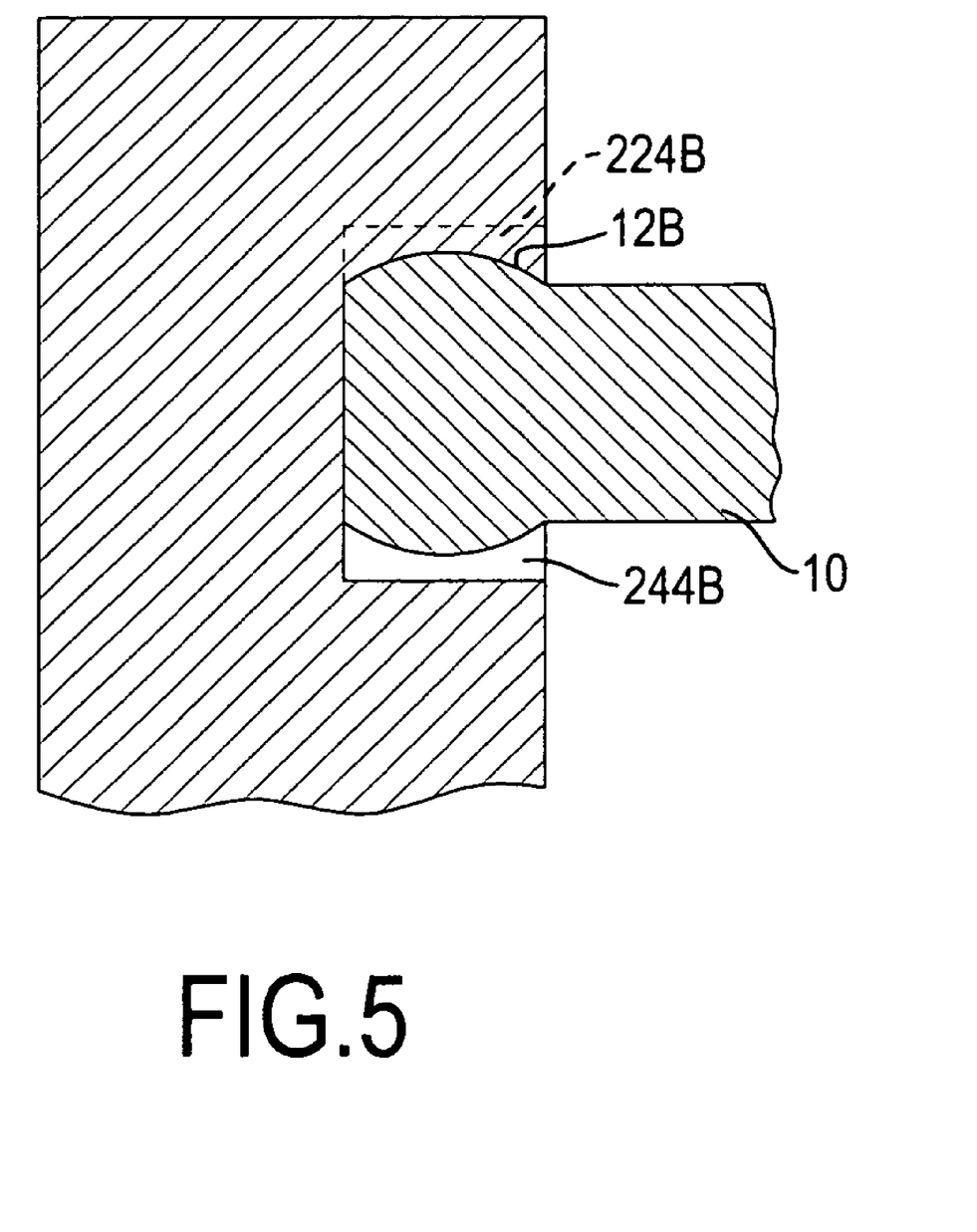
FIG. 5 is an operational cross sectional side view of a third embodiment of a building frame in accordance with the present invention, showing that a bar is clamped on a brace assembly.

In addition, each mounting surface (12) has a cross section. The cross section may be rectangular (12) as shown in FIG. 3, triangular (12A) as shown in FIG. 4, semi-circular (12B) as shown in FIG. 5 or the like.

The brace assemblies (20) are parallel with each other. Each one of the brace assemblies (20) has a primary brace (22) and a secondary brace (24). The primary brace (22) is straight, may have an L cross-section and has multiple primary mounting recesses (222). With further reference to FIGS. 4 and 5, the primary mounting recesses (222) are separately formed in the primary brace (22) and each has an inner surface and a primary clamping structure (224, 224A, 224B).

The primary clamping structure (224, 224A, 224B) is formed on the inner surface of the primary mounting recess (222) and corresponds to and is selectively and detachably engaged the mounting surface (12) on the top surface of the bar (10). The primary clamping structure (224, 224A, 224B) may be a protrusion or a recess formed on the inner surface of the primary mounting recesses (222). In the preferred embodiment of the present invention, the primary clamping structure (224) may have a rectangular, triangular or semi-circular cross section and is engaged the mounting surface (12) on the top surface of the bar (10).

The secondary brace (24) is symmetrical to and leans against the primary brace (22) and has multiple secondary mounting recesses (242). The secondary mounting recesses (242) are separately formed in the secondary brace (24), and each one of the secondary mounting recesses corresponds to and aligns with one of the primary mounting recesses (222) and has an inner surface and a secondary clamping structure (244, 244A, 244B).

The secondary clamping structure (244, 244A, 244B) is formed on the inner surface of the secondary mounting recess (242) and corresponds to and is detachably and selectively engaged the mounting surface (12) formed on the bottom surface of the bar (10). The secondary clamping structure (244, 244A, 244B) has a cross section corresponding to that of the mounting surface (12) on the bottom surface of the bar (10) and is engaged the corresponding mounting surface (12).

Figure 6:
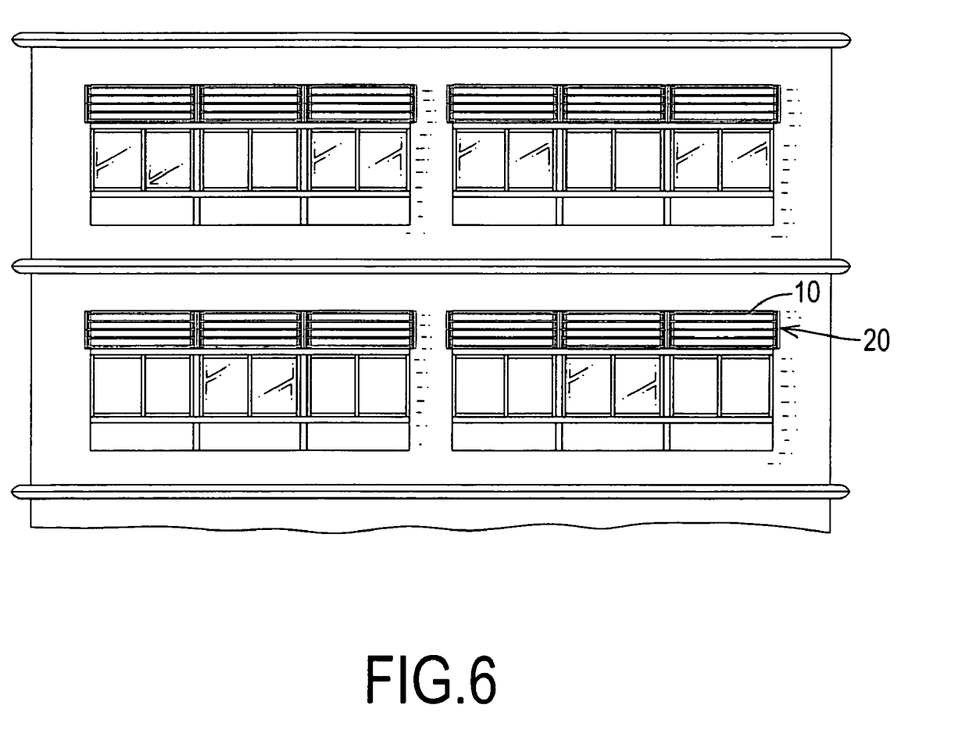
FIG. 6 is an operational front view of building frames in accordance with the present invention used for a window fence on a building.
Figure 7:
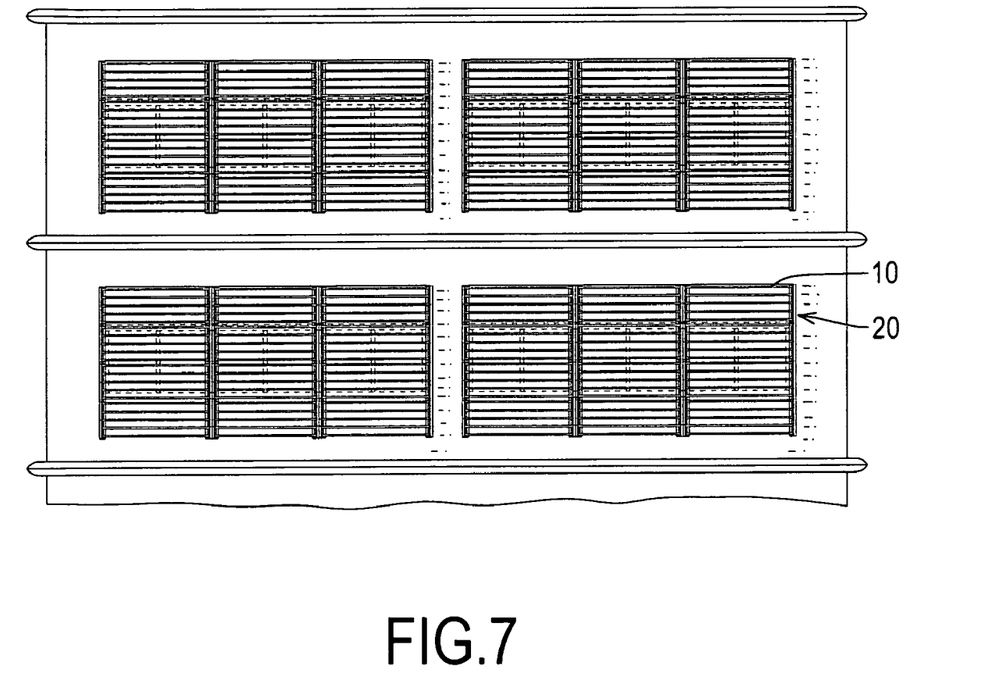
FIG. 7 is an operational front view of building frames in accordance with the present invention used for a beautification fence for the building.

FIGS. 6 and 7 show the easy assembling building frames in accordance with the present invention are mounting on an outer surface of a building in front of a window for reducing solarization of the building. When assembling, each primary brace (22) is parallelly and securely mounted on the outer surface near the window, then the secondary brace (24) of each brace assembly (20) is hold by a person and is movably leant against to one of the primary brace (22) so that the primary and secondary mounting recesses (222, 242) are corresponded to each other. Then each bar (10) may be independently placed temperally in one mounting recess (222, 242). Although each bar (10) may still not be securely clamped, the bar (10) is still movable after temperally placed in the mounting recess (222, 242), the bar (10) is not easily escaped from the mounting recess (222, 242) since the mounting surface (12) formed on the top surface of the bar (10) is slightly hook on the primary clamping structure (224).

After all bars (10) are successively mounted in the corresponded primary and secondary mounting recesses (222, 242), the bars (10) are then clamped by the primary and secondary clamping structure (224, 244) when the secondary braces (24) are slightly moved up. Hence, even multiple brace assemblies (20) are applied for a building frame and combined with multiple bars (10), all bars (10) may be well assembled on the brace assemblies (20) easily. On the contrary, to disassemble the assembling building frame is also very easy and fast by reverse steps as described above.

Furthermore, the building frame may also be well assembled on a ground before mounted in front of a window. For instance, the bars (10) may be temperally mounted in the mounting recesses (222, 242) of the parallelly arranged brace assemblies (20) and may be securely mounted on the brace assemblies (20) after the primary brace (22) and the secondary brace (24) are alternatively moved.

Figure 8:
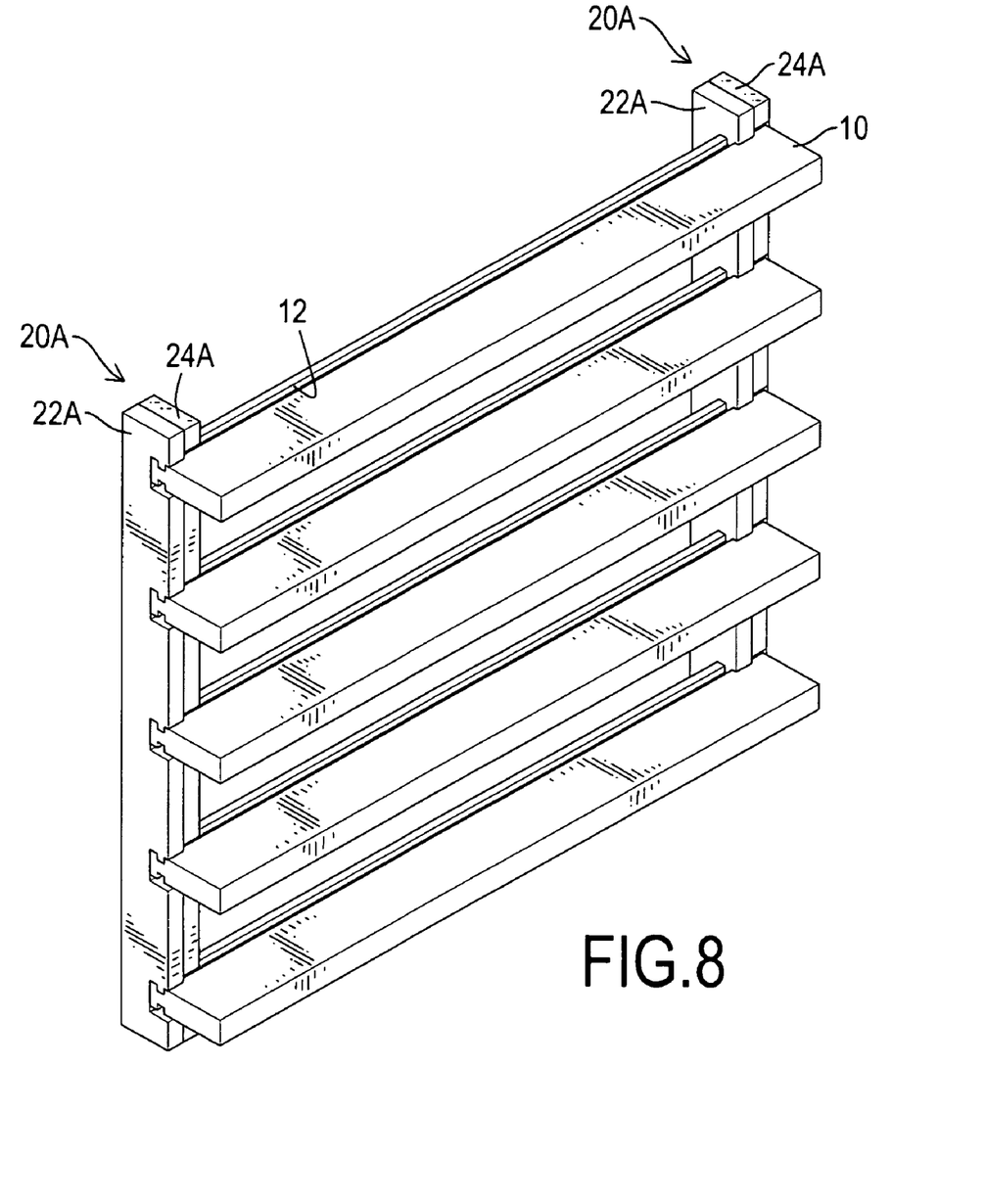
FIG. 8 is a perspective view of a second embodiment of the building frame having a rectangular primary and secondary brace in accordance with the present invention.

When the building frame in accordance with the present invention is used for other architectures of the buildings, such as railings, palings, frames inside reinforce concrete structure or the like, the primary and secondary may not necessarily have L-shaped cross-sections. With reference to FIG. 8, brace assemblies (20A) comprises a primary assembly (22A) and a secondary assembly (24A) independently having a rectangular cross-section. Each primary assembly (22A) may be securely mounted with one secondary assembly (24A) after clamping with the bars (10), thereby the building frame may be well assembled in a very short time.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A building frame comprising
   a plurality of bars, each of said bars being straight and having
      a top surface;
      a bottom surface;
      a longitudinal edge; and
      two mounting surfaces being respectively formed on the top and the bottom surfaces of the bar adjacent to and parallel with the longitudinal edge; and
   at least two brace assemblies being parallel with each other and detachably engaging the bars, and each one of the brace assemblies having
      a primary brace being straight and having
         multiple primary mounting recesses being separately formed in the primary brace and each one of the primary mounting recesses having
            an inner surface; and
            a primary clamping structure being formed on the inner surface of the primary mount and corresponding to and being detachably engaged the mounting surface on the top surface of one of the bars; and
      a secondary brace being symmetrically to and leant against the primary brace and having
         multiple secondary mounting recesses being separately formed therein and each one of the secondary mounting recesses corresponding to and aligning with one of the primary mounting recesses; and each secondary mounting recess having
            an inner surface; and
            a secondary clamping structure being formed on the inner surface of the secondary mounting recess and corresponding to and being detachably engaging the mounting surface formed on the bottom surface of one of the bars.

2. The building frame as claimed in claim 1, wherein each one of the primary and secondary braces is a straight bar having an L-shaped cross section.

3. The building frame as claimed in claim 1, wherein
   the mounting surfaces of each bar are indented surfaces formed respectively in the top surface and the bottom surface of the bar; and
   each primary clamping structure and each secondary clamping structure are protrusions corresponding to and being detachably engaged respectively the mounting surfaces on the top and bottom surfaces of one of the bars.

4. The building frame as claimed in claim 2, wherein
   the mounting surfaces of each bar are indented surfaces formed respectively in the top surface and the bottom surface of the bar; and
   each primary clamping structure and each secondary clamping structure are protrusions corresponding to and being detachably engaged respectively the mounting surfaces on the top and bottom surfaces of one of the bars.

5. The building frame as claimed in claim 2, wherein each bar has a rectangular cross section.

* * * * *